United States Patent [19]
Hayes

[11] 3,887,493
[45] June 3, 1975

[54] METHOD OF PREPARING SPHEROIDAL ETA-ALUMINA PARTICLES

[75] Inventor: John C. Hayes, Palatine, Ill.

[73] Assignee: Universal Oil Products Company, Des Plaines, Ill.

[22] Filed: July 16, 1973

[21] Appl. No.: 379,678

[52] U.S. Cl............................... 252/448; 252/477
[51] Int. Cl............................................. B01j 11/44
[58] Field of Search..................................... 252/448

[56] References Cited
UNITED STATES PATENTS

| | | | |
|---|---|---|---|
| 2,620,314 | 12/1952 | Hoekstra............................ | 252/448 |
| 2,666,749 | 1/1954 | Hoekstra............................ | 252/448 |
| 2,689,226 | 9/1954 | Hoekstra........................ | 252/448 X |
| 2,703,315 | 3/1955 | Murray et al. ...................... | 252/448 |
| 2,774,743 | 12/1956 | Hoekstra............................ | 252/448 |
| 2,865,866 | 12/1958 | Hoekstra............................ | 252/448 |
| 3,027,234 | 3/1962 | Michalko....................... | 252/448 X |
| 3,096,295 | 7/1963 | Michalko............................ | 252/448 |
| 3,600,129 | 8/1971 | Vesely................................ | 252/448 |
| 3,714,071 | 1/1973 | Michalko............................ | 252/448 |

Primary Examiner—Helen M. S. Sneed
Attorney, Agent, or Firm—James R. Hoatson, Jr.; Robert W. Welch; William H. Page, II

[57] ABSTRACT

A method of preparing spheroidal eta-alumina particles. An acidic alumina hydrosol is commingled with a gelling agent and dispersed as droplets in a hot oil suspending media to form firm, spherical, hydrogel particles. The particles are washed at a temperature of from about 25° to about 60° C., and at a pH of at least about 5.5, with an aqueous salt solution having a salt concentration substantially equivalent to that of the aqueous phase of the hydrogel particles. The salt concentration is reduced during the washing process until the wash-water is salt-free and the pH is adjusted to at least about 9. Spheroidal bayerite alumina particles are produced which, upon calcination, yield spheroidal eta-alumina particles.

7 Claims, No Drawings

METHOD OF PREPARING SPHEROIDAL ETA-ALUMINA PARTICLES

This invention relates to the manufacture of spheroidal alumina particles. Alumina, as porous aluminum oxide in either the anhydrous form or any of the various hydrated forms, is widely employed in the chemical and petroleum industries. In particular, the activated aluminas designated as gamma-alumina and eta-alumina have long been known for their profound catalytic activity and adsorbent capacity.

While the structural formulae of gamma-alumina and eta-alumina are essentially the same, the actual structures are substantially different. This is evidenced by the fact that gamma-alumina, produced by high temperature calcination of boehmite alumina, exhibits a surface area generally in the range of from about 180 to about 250 square meters per gram, while eta-alumina, produced by the high temperature calcination of bayerite alumina, has a surface area generally in the range of from about 250 to about 350 square meters per gram.

Those skilled in the art of catalysis will recognize that an alumina with a surface area in the range of from about 250 to about 350 square meters per gram is in many instances more desirable than an alumina with a surface area in the 180–250 square meter per gram range when utilized as an adsorbent, a catalyst, or as a carrier material for one or more catalytic components. The former has a significantly greater adsorption capacity per unit weight than the latter and, when utilized as a carrier material in the manufacture of catalytic composites, possesses a higher intrinsic activity as well as a greater tendency to retain catalytic activators such as halogen during processing.

When utilized as an adsorbent, catalyst, or as a catalyst carrier material, spheroidal alumina particles offer numerous advantages. When employed in a reaction or contact zone as a fixed bed, the spheroidal particles permit more uniform packing to reduce variations in pressure drop across the bed, and tendency of the reactant stream to channel through the bed and by-pass a portion of the catalyst or adsorbent, as the case may be, is thereby reduced. When employed in a moving bed type of operation, e.g., wherein the particles gravitate through a reaction zone, or are transported from one zone to another by the reactant stream or an extraneous carrying media, the spheroidal particles have a further advantage in that there are no sharp edges to erode or break off with the formation of fines which tend to plug process equipment.

Spheroidal alumina particles of substantially uniform size and shape are advantageously manufactured by the method whereby an acidic alumina hydrosol is commingled with a gelling agent at below gelation temperature and the mixture dispersed as droplets in a water-immiscible suspending media, usually a gas oil, maintained at an elevated temperature whereby the hydrosol droplets are formed into firm hydrogel particles. The method, commonly referred to as the oil-drop method, is described by Hoekstra in U.S. Pat. No. 2,620,314.

The method requires a gelling agent which has the ability to effect a progressive neutralization of the acidic hydrosol over a given time interval permitting the droplets to be drawn into spheres before the gelation stage is reached. Conventional gelling agents, such as ammonium hydroxide, are inoperable since they produce immediate gelation of the acidic hydrosol as a result of which spherically shaped particles cannot be formed. In this regard, acceptable gelling agents include weak bases having a strong buffering action. An ammonia precursor such as hexamethylenetetramine, urea, or mixtures thereof, which is substantially stable at normal temperatures by decomposable or hydrolyzable to ammonia with increasing temperature, is suitable employed.

It has been the practice to retain and age the hydrogel spheres in the hot suspending media for an extended period. During the aging process, the residual ammonia precursor retained in the spheroidal gel particles continues to hydrolyze with the evolution of ammonia. The high temperature oil aging process has heretofore been considered as essential to obviate excessive cracking and sphere disintegration during the subsequent water-wash treatment for the separation of soluble salts. However, the practice also promotes the formation of crystalline boehmite alumina which, upon calcination at 370°–650°C. is invariably transformed to gamma-alumina.

It is an object of this invention to obviate excessive cracking and disintegration of alumina spheres produced by the oil drop method without recourse to high temperature oil aging of the spheres. It is a further object to present a novel oil drop method for the manufacture of spheroidal bayerite alumina particles which, upon high temperature calcination, are converted to spheroidal eta-alumina particles.

Thus, in one of its broad aspects, the present invention embodies a method of preparing spheroidal bayerite alumina particles which comprises commingling an ammonia precursor and an acidic alumina hydrosol at below gelation temperature, said ammonia precursor being decomposable to ammonia with increasing temperature; dispersing the mixture as droplets in a hot oil bath effecting decomposition of said ammonia precursor and formation of hydrogel spheres therein; separating and immersing the hydrogel spheres in an aqueous salt solution at a temperature of from about 25° to about 60°C., said solution having a pH of at least about 5.5 and a salt concentration substantially equivalent to that of the internal aqueous phase of said hydrogel spheres; maintaining said spheres in contact with said solution at said temperature while gradually reducing the salt concentration at conditions to minimize the concentration gradient between said solution and the internal aqueous phase of said spheres until said solution is substantially salt-free, and adjusting the pH of said solution to at least about 9; and separating and drying the resultant salt-free bayerite alumina spheres. One preferred embodiment of this invention concerns a method of preparing spheroidal eta-alumina particles wherein the last-mentioned bayerite alumina spheres are calcined at a temperature of from about 425° to about 750° C. and converted to eta-alumina spheres.

Other objects and embodiments of this invention will become apparent in the following detailed specification.

The acidic alumina hydrosol herein contemplated includes such as are prepared by the hydrolysis of a suitable acid salt of aluminum, for example aluminum chloride, and reduction of the acid anion concentration of the solution, for example, the chloride anion concentration thereof. Reduction of the acid anion concentration can be accomplished by subjecting the aluminum salt solution to electrolysis utilizing an electrolytic cell with a porous partition between the anode and cathode. In this manner, an acid anion deficiency is created in the cathode compartment whereby an olation reaction is promoted with the formation of inorganic polymers of colloidal dimension dispersed and suspended in the remaining liquid. In some cases, as in the case of aluminum acetate, where the acid anion is sufficiently volatile, the reduction in acid anion concentration can be effected simply by heating. A particularly suitable method is in the use of aluminum metal as a neutralizing agent in conjunction with, for example, an aqueous aluminum chloride solution. In this instance the salt of neutralization is itself a hydrolyzable aluminum salt subject to polymerization and ultimate sol formation.

An aluminum chloride hydrosol, variously referred to as an aluminum oxychloride hydrosol, aluminum hydroxychloride hydrosol, and the like, is a preferred acidic alumina hydrosol for use in the method of this invention. A particularly desirable aluminum chloride hydrosol is prepared by digesting aluminum metal in hydrochloric acid at about reflux temperature — usually a temperature of from about 80° to about 105° C., and reducing the chloride anion concentration of the resulting aluminum chloride solution by the device of maintaining an excess of aluminum reactant in contact with the reaction mixture as a neutralizing agent until a hydrosol containing aluminum and chloride anion in a ration of from about 0.9:1 to about 1.5:1 is formed. The hydrosol is preferably prepared to contain less than about 14 wt. % aluminum, generally from about 12 to about 14 wt. %.

In accordance with the oil drop method, the acidic aluminum hydrosol is commingled with an ammonia precursor at below gelation temperature, suitably at a temperature of from about 25° to about 45° C., in ammonia precursor being decomposable or hydrolyzable to ammonia with increasing temperature. Thus, as the mixture is dispersed as droplets in a hot oil bath, ammonia is evolved and acts as a neutralizing or setting agent, and an ammonium salt of neutralization is formed in the aqueous phase of the resulting spheroidal hydrogel particles. The ammonia precursor is most often hexamethylenetetramine, or urea, or mixtures thereof, although other weakly basic materials which are substantially stable at normal temperatures by decomposable or hydrolyzable to ammonia with increasing temperature may be employed. The acidic alumina hydrosol is commingled with a sufficient amount of hexamethylenetetramine, or other ammonia precursor, to effect at least complete neutralization of the acid anion contained in said hydrosol upon total decomposition or hydrolysis to ammonia. For example, an aluminum chloride hydrosol is typically commingled with a sufficient quantity of a 28–40 wt. % aqueous hexamethylenetetramine solution to provide a mixture containing hexamethylenetetramine and chloride anion in a molar ratio of about 1:2.

The mixture is formed into spheroidal hydrogel particles on being dispersed as droplets in a hot oil bath at a temperature effecting decomposition of the ammonia precursor — usually a temperature of from about 50° to about 105° C. The oil is typically a light gas oil chosen principally for its high interfacial tension with respect to water. Passage of the droplets through the oil bath produces two effects. First, as each droplet penetrates the oil surface, it draws into a spherical shape.

The droplets are principally water at this stage and, being insoluble in the oil suspending media, they tend to draw into a shape resulting in the least surface area for their volume. The second effect is that the formed spheres are given time to gel in the presence of the decomposing ammonia precursor and convert to firm hydrogel particles as they gravitate to the bottom of the oil suspending media.

As previously mentioned, it has been the practice to retain and age the hydrogel spheres in the hot oil suspending media for an extended period, and thereafter in a hot aqueous alkaline media for a further extended period, the hot oil aging being considered as essential to obviate extensive cracking and sphere disintegration during the subsequent aqueous treatments. It has now been determined that the cracking and sphere disintegration heretofore observed is caused by osmotic swelling of the hydrogel spheres— the result of the salt concentration gradient between the aqueous phase of the hydrogel spheres and the external aqueous phase in contact therewith.

In accordance with the present invention, the hydrogel spheres are separated and immersed in an aqueous salt solution having a pH of at least about 5.5 and a salt concentration substantially equivalent to the salt concentration of the internal aqueous phase of the hydrogel spheres. Generally, the salt concentration will be in the range of from about 0.5 to about 10 molar. In any case, the required concentration is readily determined by analysis of the syneresis liquor which exudes from the hydrogel spheres during the gelation process and collects at the bottom of the oil bath. The salt contained in the internal aqueous phase of the hydrogel spheres will invariably be an ammonium salt resulting from neutralization of the acid anion contained therein, — e.g., chloride, and the aqueous salt solution is usually, although not necessarily, an aqueous ammonium chloride solution.

The hydrogel spheres are maintained in contact with the salt solution while reducing the salt concentration gradually so as to minimize the concentration gradient between said solution and the internal aqueous phase of the hydrogel spheres until the solution is substantially saltfree. For example, a volume of the hydrogel spheres is immersed in a substantially equal volume of an aqueous salt solution in a vertical contact column at a temperature of from about 25° to about 60° C. The aqueous solution is then processed upwardly in contact with the hydrogel spheres, the overhead effluent being continuously recycled to said contact column. A pH of at least about 5.5 is maintained by the addition of ammonia or ammonium hydroxide to the recycle stream, and the salt concentration is gradually reduced by dilution of the recycle stream with deionized water until the solution is substantially salt-free. The contact column is provided with an overflow or weir to maintain a substantially constant volume therein as the aqueous salt solution is being diluted.

Pursuant to the method of this invention, the pH of the aqueous solution is adjusted to at least about 9 whereby the amorphous alumina spheres transform gradually to crystalline bayerite alumina spheres. Although the pH can be adjusted upwardly in the course of reducing the salt concentration, for example, by the addition of a sufficient quantity of ammonia or ammonium hydroxide to the aforementioned recycle stream, the strong buffering action of ammonium chloride makes it a preferred practice to adjust the pH after the solution is salt-free, or substantially salt-free. In any case, the alumina spheres are maintained in contact with said solution at said pH of at least about 9, and at a temperature of from about 25° to about 60° C., for a time determined by the desired degree of conversion to a crystalline bayerite alumina as evidenced by the gradual transformation of the clear, transparent, amorphous alumina spheres to white, opaque, bayerite alumina spheres.

The aged hydrogel spheres are suitably dried at a temperature of from about 95° to about 315° C. over a period of from about 0.5 to about 5 hours or more. Sphere shrinkage with attendant cracking, commonly experienced during the drying process, is minimized by including a surfactant in the final wash water prior to drying. Non-ionic surfactants such as the polyoxyethylene alkyl phenols, polyoxyethylene alcohols, polyoxyethylene esters of fatty acids, polyoxyethylene mercaptans, polyoxyethylene alkyl amines, polyoxyethylene alkyl amides, and the like, are to be preferred. In any case, the dried bayerite alumina spheres are calcined, preferably in an oxidizing atmosphere such as air, at a temperature of from about 425° to about 750° C., and converted to the eta-alumina form.

The following example is presented in illustration of the method of this invention and is not intended as an undue limitation on the generally braod scope of the invention as set out in the appended claims.

EXAMPLE 1

An acidic alumina hydrosol was prepared by digesting aluminum in dilute hydrochloric acid at about 102° C. to yield a hydrosol with a specific gravity of about 1.345, and containing aluminum in about a 1.4:1 weight ratio with the chloride anion content thereof. The hydrosol was cooled to about 6° C. and admixed with an equal volume of a 28% aqueous hexamethylenetetramine solution. The mixture was dispersed as droplets in a gas oil suspending media contained in a dropping tower at about 95°C. The syneresis liquor, which exuded from the droplets as they formed into hydrogel spheres and collected at the bottom of the forming tower, had a pH of 5.8 and an ammonium chloride concentration of about 1.2 molar. Within about 30 minutes, about a 1.5 liter volume of the spheres was transferred from the forming tower to a vertical contact column containing about 2 liters of a 1.2 molar aqueous ammonium chloride solution at a pH of 5.8. The aqueous solution was processed upwardly through the contact column at room temperature and recycled at a rate of about 1 liter per minute. Fresh ammoniated water with a pH of 7.5 was added to the recycle stream at the rate of approximately 100 cubic centimeters per hour, and the resulting excess solution discharged from the contact column by means of a weir provided to maintain a substantially constant volume therein. After about 100 hours, the ammonium chloride concentration had been reduced to about 0.002 molar. The ammoniated water addition was continued to bring the pH to about 10, and the spheres were aged at said pH, at room temperature, for a period of about 72 hours. The spheres were then detergent-rinsed and air-dried. X-ray analysis indicated the spheres to contain approximately 20% bayerite alumina. The spheres were thereafter oven-dried and calcined at about 625° C. to convert the bayerite to eta-alumina.

I claim as my invention:

1. A method of preparing spheroidal alumina particles which comprises:
   a. commingling an ammonia precursor and an acidic alumina hydrosol at below gelation temperature, said ammonia precursor being decomposable to ammonia with increasing temperature;
   b. dispersing the mixture as droplets in a hot oil bath effecting decomposition of said ammonia precursor and formation of hydrogel spheres therein;
   c. immersing the hydrogel spheres in an aqueous ammonium chloride salt solution at a temperature of from about 25° to about 60° C., and at a pH of at least about 5.5, said aqueous salt solution having a salt concentration substantially equivalent to the salt concentration of the internal aqueous phase of said hydrogel spheres;
   d. maintaining said hydrogel spheres in contact with said solution at said temperature while gradually reducing the salt concentration at conditions to minimize the concentration gradient between said solution and the internal aqueous phase of said hydrogel particles until said solution is substantially salt-free, and adjusting the pH of said solution to at least about 9;
   e. aging the spheres at said pH of at least about 9 and forming crystalline bayerite alumina spheres.

2. The method of claim 1 further characterized with respect to step (a) in that said ammonia precursor is hexamethylenetetramine.

3. The method of claim 1 further characterized with respect to step (a) in that said ammonia precursor is utilized in an amount to effect substantially complete neutralization of the acid anion contained in said hydrosol.

4. The method of claim 1 further characterized with respect to step (a) in that said hydrosol is an aluminum chloride hydrosol containing aluminum in from about a 0.9 to about a 1.5 weight ratio with the chloride anion content thereof, and said ammonia precursor is hexamethylenetetramine utilized in from about a 1:2.5 to about a 1:1.5 mole ratio with the chloride anion concentration of said hydrosol.

5. The method of claim 1 further characterized with respect to step (b) in that said oil bath is maintained at a temperature of from about 50° to about 105° C.

6. The method of claim 1 further characterized with respect to step (c) in that said aqueous salt solution is from about a 0.5 to about a 10 molar ammonium chloride solution.

7. The method of claim 1 further characterized with respect to step (e) in that said crystalline bayerite alumina spheres are calcined at a temperature of from about 425° to about 750° C. and converted to eta-alumina spheres.

* * * * *